(12) United States Patent
Van Der Vleuten et al.

(10) Patent No.: US 8,374,344 B2
(45) Date of Patent: Feb. 12, 2013

(54) CODING

(75) Inventors: Renatus Josephus Van Der Vleuten, Eindhoven (NL); Mihaela Van Der Schaar, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 214 days.

(21) Appl. No.: 12/884,338

(22) Filed: Sep. 17, 2010

(65) Prior Publication Data

US 2011/0019729 A1 Jan. 27, 2011

Related U.S. Application Data

(63) Continuation of application No. 09/975,382, filed on Oct. 10, 2001, now abandoned.

(51) Int. Cl.
 *H04L 9/00* (2006.01)
(52) U.S. Cl. .......................................................... 380/42
(58) Field of Classification Search .................. 380/200, 380/217, 208, 37, 42; 382/254, 232, 240.03, 382/278; 386/27
 See application file for complete search history.

(56) References Cited

U.S. PATENT DOCUMENTS

| | | | |
|---|---|---|---|
| 4,918,523 A | 4/1990 | Simon et al. | |
| 5,506,623 A | 4/1996 | Sako et al. | |
| 5,809,139 A | 9/1998 | Girod et al. | |
| 5,892,848 A | 4/1999 | Nishiwaki et al. | |
| 5,978,762 A * | 11/1999 | Smyth et al. | 704/229 |
| 6,094,636 A | 7/2000 | Kim | |
| 6,148,028 A | 11/2000 | Kikuchi et al. | |
| 6,148,288 A | 11/2000 | Park | |
| 6,415,398 B1 | 7/2002 | Kikuchi et al. | |
| 6,493,387 B1 | 12/2002 | Shin et al. | |
| 6,570,922 B1 | 5/2003 | Wang et al. | |
| 6,658,057 B1 | 12/2003 | Chen et al. | |
| 6,845,159 B1 | 1/2005 | Domstedt et al. | |
| 6,915,319 B1 * | 7/2005 | Sato | 708/313 |
| 6,925,249 B1 | 8/2005 | Meier et al. | |
| 2002/0164017 A1 | 11/2002 | Wee et al. | |
| 2003/0059123 A1 | 3/2003 | Omori | |
| 2005/0216815 A1 | 9/2005 | Novotny et al. | |

FOREIGN PATENT DOCUMENTS

| | | |
|---|---|---|
| EP | 0201037 A2 | 12/1986 |
| EP | 0821507 A2 | 1/1998 |
| EP | 0853407 A2 | 7/1998 |
| EP | 0939545 A2 | 9/1999 |
| JP | 10333698 A | 12/1998 |
| JP | 11331852 A | 11/1999 |
| WO | 9701934 A1 | 1/1997 |
| WO | 9729605 A1 | 8/1997 |

OTHER PUBLICATIONS

Jeongnam Youn "Video Transcoder Architectures for Bit Rate Scaling of H.263 Bit Streams", Orlando, FL, US, pp. 243-250, 1999 ISBN:1-58113-151-8.
Anthony Vetro et al, "Object-Based Transcoding for Scalable Quality of Service ISCAS 2000", IEEE International Symposium on Circuits and Systems, May 28-31, 2000, Geneva, CH, Mitsubishi Electric ITA Advanced Television Laboratory, NJ.

(Continued)

*Primary Examiner* — Nirav B Patel

(57) ABSTRACT

Coding is provided in which a multi-media object is coded to obtain a bit-stream, and quality information is added to the bit-stream, which quality information indicates a quality of the object in relation to a given position in (or a given part of) the bit-stream. By adding quality information to the bit-stream, jointly storing or transmitting multiple coded objects can be optimized in that the quality of the object can be easily taken into account.

19 Claims, 1 Drawing Sheet

OTHER PUBLICATIONS

Ramanujan et al, "Adaptive Streaming of MPEG Video over IP Networks", Local Computer Networks, Proceedings, Nov. 19997, pp. 398-409.

Li, "Fine Granularity Scalability in MPEG-4 for Streaming Video", Proceedings of the 2000 IEE International Symposium on Circuits and Systems, vol. 5 of 5, 2000, pp. 299-302.

"Information Technology—Coding of Audio-Visual Objects" Part 2: Visual, Amendment 4: Streaming Video Profile, Amendment, International Organisation for Standardisation, ISO/IEC, Mar. 2000, 1-190 pages.

"JPEG 2000 Part I Final committee Draft Version 1.0", ISO/IEC JTC1/SC20/WG1 N1646, Mar. 16, 2000, pp. 1-190.

* cited by examiner

CODING

This application claims priority to and the benefit of the earlier filing date, pursuant to 35 USC §120, of the co-pending patent application entitled "Coding," filed on Oct. 10, 2001 and afforded Ser. No. 09/975,382, the contents of which are incorporated by reference, herein.

The invention relates to coding multi media objects.

Scalable compression, e.g. fine-granularity scalable compression of objects such as multi-media objects has the useful feature that the encoded bit stream may be truncated at a given point, while the remaining stream can still be decoded (although at a lower object quality). A standard of such a scalable coding, i.e. MPEG-4 Fine Granularity Scalability, is currently being defined, see ISO/IEC 14496-2/AMD 4, document ISO/IEC JTC1/SC29/WG11N3315, March 2000 (further called N3315), which is incorporated by reference herein. A further scalable coding method is described in non pre-published European Patent Application 00201037.9, filed Mar. 23, 2000 (our reference PHNL000153), which is also incorporated by reference herein.

The availability of such a scalable bit stream considerably simplifies system designs by practically eliminating the need for a buffer control method when fitting the encoded bit stream to a certain given bit rate or memory size. In particular, the same single bit stream simultaneously serves different channels with different capacities, without the need to re-encode the original data. Thus, real-time adaptation to varying channel capacities (with application to the Internet or wireless communication channels) is very much simplified.

Before fine granularity scalability, already some forms of limited scalability existed. There, the bit stream consisted of a few large layers, i.e. a base layer and e.g. one or two enhancement layers. Such scalability is defined e.g. in the JPEG standard (hierarchical coding) as well as in the MPEG2 standard (SNR scalability, spatial scalability, temporal scalability).

An object of the invention is to provide advantageous coding. To this end, the invention provides coding of a multimedia object to obtain a bit-stream, controlling a bit-stream, transmitting a bit-stream, receiving a bit-stream, a multiplexer or network node, a (scalable) bit-stream representing a multi-media object, a storage medium, a computer program, and a signal carrying a computer program as defined in the independent claims. Advantageous embodiments are defined in the dependent claims.

According to a first aspect of the invention, a multi-media object is coded to obtain a bit-stream, and quality information is added to the bit-stream, which quality information indicates a quality of the object in relation to a given position in (or a given part of) the bit-stream. By adding quality information to the bit-stream, jointly storing or transmitting multiple coded objects can be optimized in that the quality of the object can be easily taken into account. This aspect of the invention is based on the insight that it is easy to determine the rate of a compressed object, but that another important parameter, a quality measure, e.g. distortion, is not so easily determined. In fact, the distortion can only be accurately obtained at the time of coding, when the complete source information is still available. According to this aspect of the invention, the bit stream syntax is enhanced by adding quality (distortion) information. This can be done at no or a negligible increase in bit rate and extends the range of applications for several coding schemes. The multi-media object may be an audio and/or video object or any other reproducible object for which a quality is relevant. The multi-media object may also be a picture or a sequence of pictures such as a program.

Preferably, the coding is a scalable coding and the resulting bit-stream is a scalable bit-stream. Especially for scalable coding schemes, quality information is advantageous because these bit-streams are suitable for truncating. For a lot of applications, wherein scalable bit-streams are truncated, it is important to have a quality indication of the bit-stream resulting after truncation, which is easily provided by the quality information included in the scalable bit-stream.

Preferably, the quality information represents object reproduction quality. Information on object reproduction quality versus number of bits is then easily determined. To quantify the quality, preferably signal-to-noise ratio (SNR) or peak-signal-to-noise-ratio (PSNR) values are used Whereas the encoded stream of a single object may be truncated optimally by just fitting it to the available bandwidth/storage, this is not the case when simultaneously dealing with multiple objects. To optimally allocate a certain bandwidth or storage space to multiple objects simultaneously, one has to know the differential rate-distortion curve for each encoded object. While this curve is relatively easily obtained during the encoding of an object (when the original is available), it is non-trivial to obtain (by estimation) later, when only a truncated version of the encoded bit stream is available. Estimation of the quality at a later time requires detailed knowledge of the compression method as well as at least partial decoding of the encoded bit stream.

In a practical embodiment, quality tags added to the scalable bit-stream represent the quality of the reproduction of the encoded object when the bit-stream is truncated at a point related to a given tag. Although the addition of the quality information may require a given overhead, this overhead can be kept small. An important advantage is that the quality information makes it easy to jointly optimally truncate the bit-streams of multiple objects. Such a multiple truncation problem occurs for example in an elastic memory as described in non pre-published European Patent Application 00200890.2, filed Mar. 13, 2000 (our reference PHNL000110), which is incorporated by reference herein. Another application is a multiplexer or a network node in which the outgoing bandwidth is temporarily lower than the incoming bandwidth and consequently the incoming scalably compressed bit-streams need to be truncated.

When doing compression, the input data is usually compressed in multiple units (such as e.g. parts of DCT blocks, parts of frequency bands of a wavelet transformed image or layers). Each coded part usually contains some headers with various parameters or tags. In an advantageous embodiment of the invention, in such a header, a parameter is added indicating the quality of the object when it is truncated just after (or alternatively just before) the current encoded data part. One example of a quality parameter is to add a number related to the mean squared error (or PSNR or SNR) of the reproduction; the number might also represent a visually weighted (P)SNR. The type (or multiple types) of quality indication might be standardized, so all encoders will use the same or a limited number of different quality indicators. The quality could also be relative (for example a percentage), so an encoder would not have to disclose its quality measure. The relative quality might then range from 0 to 100% of a certain scale for each individual object, with an additional scale/weight parameter for each object to enable different weighting of the various objects.

The quality tags may be placed at approximately equal distances (number of bits) throughout the encoded stream or they may be used more frequently when the bit rate versus quality curve is quickly changing. When an encoded bit stream has to be truncated, the quality for each truncation point not corresponding to a tag location can be approximated by interpolation (linear or more complex) of the quality tag values.

In an embodiment of the invention, the quality information is added to the encoded bit stream of MPEG-4 FGS using a tag that has already been defined in the standard, see the above-mentioned reference N3315. In this way, the quality information can be added without having to change the proposed standard, which is a tremendous advantage.

For decoded multi-media objects, the quality information may be used for adaptive post-processing or for scalable video processing algorithms etc for non-scalable compression methods. For example, for post-processing of MPEG-compressed video, the quality information can help to determine the 'strength' or amount or type (blocking artifacts/ringing reduction) of post-processing required. For scalable video algorithms, the quality information can help to better estimate the number of CPU cycles required to achieve a certain desired processing quality level using a certain selected video processing algorithm.

The quality information may be added as side information to the bit-stream, i.e. not included in the bit-stream itself.

For encrypted bit-streams, it is advantageous that the quality information is unencrypted. The quality of a given part of the bit-stream (e.g. layer) can then be determined in a decoder without decrypting the bit-stream.

Quality information can also be advantageously applied for applications in which source coding and channel coding are not carried out at the same time or location. The quality information is then used in the channel coding, e.g. to determine the protection rates.

The aforementioned and other aspects of the invention will be apparent from and elucidated with reference to the embodiments described hereinafter.

The drawings only show those elements that are necessary to understand the invention.

Figure 1:
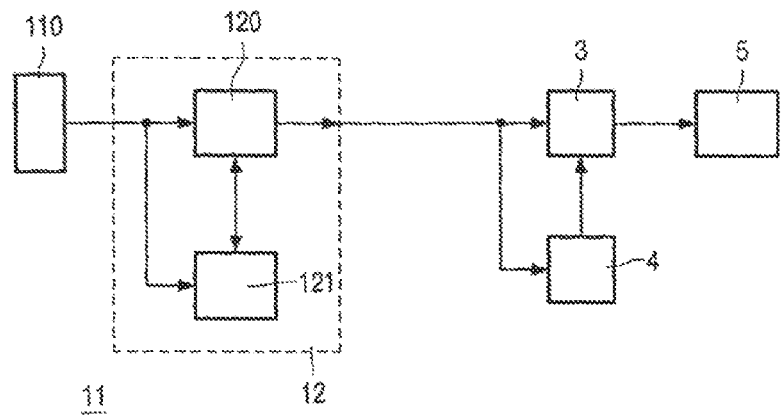
FIG. 1 shows a system according to an embodiment of the invention.

FIG. 1 shows a system according to an embodiment of the invention, the system comprising a transmitter 11 having an input unit or object generation unit 110 and an encoder 12. The encoder 12 comprises a scalable encoder 120 and a quality information generation unit 121. The scalable encoder 120 codes objects obtained from the input unit 110 to provide one or more scalable bit-streams. The quality information generation unit 121 extracts the object quality from the signals obtained from the input unit 110 as well as the signals and/or parameters provided by the encoder 120. The quality information from the generation unit 121 is provided to the encoder unit 120, which generates the quality information tags and inserts them in the scalable bit-stream. The system further comprises a truncator 3 for truncating the one or more scalable bit-streams, and a truncator control unit 4. The truncator control unit 4 extracts quality information from the scalable bit-stream provided by the encoder 12 and controls the truncator 3 in dependence on the received quality information/tags. In the case of only one scalable bit-stream, the scalable bit-stream is truncated when the desired quality has been reached. Truncator 3 and control unit 4 together may constitute part of a multiplexer, bit-rate control unit, network node, etc. and may be present in a channel, but also in a receiver. Unit 5 may alternatively be a reproduction unit and/or decoder, e.g. being present together with truncator 3 and control unit 4 in a receiver according to an embodiment of the invention.

Figure 2:
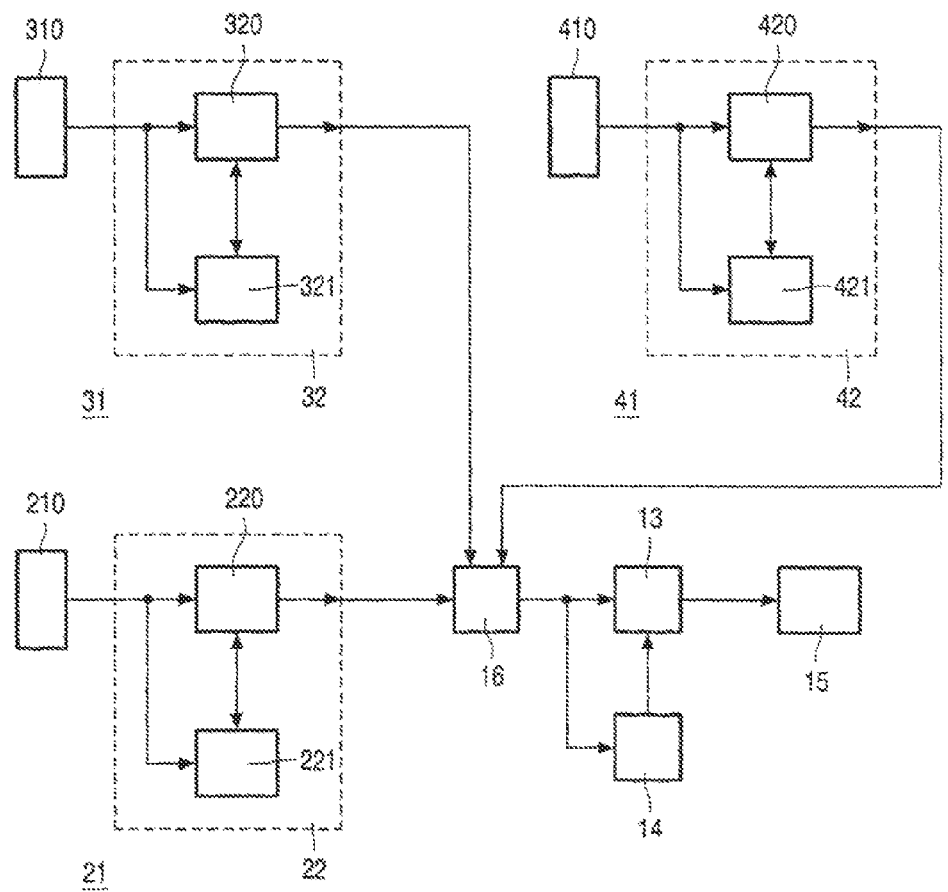
FIG. 2 shows more advantageous embodiments of the invention.

In more advantageous applications, as shown in FIG. 2, multiple scalable bit-streams are provided by transmitters 21,31,41, wherein at least some of the multiple scalable bit-streams have quality tags included in them. The transmitters 21,31,41 and their components are similar to transmitter 11 shown in FIG. 1. Depending on the available bandwidth or storage capacity on a channel or storage medium 15, the scalable bit-streams are more or less truncated, under dependence of the quality information/tags that are present in the scalable bit-streams. Such a multiple truncation can be done using the principle of elastic memory described in non prepublished European Patent Application 00200890.2, filed Mar. 13, 2000 (our reference PHNL000110), which is incorporated by reference herein. Multiplexer 16 combines the streams from the transmitters. Truncator 13 and control unit 14 together may constitute part of a multiplexer (e.g. 16), bit-rate control unit, network node, etc. and may be present in a channel, but also in a receiver. Unit 15 may alternatively be a reproduction unit and/or decoder, e.g. being present together with truncator 13 and control unit 14 in a receiver according to an embodiment of the invention.

In the following, some examples of applications of MPEG-4 FGS that need the quality information are given. Although the following is addressed in particular to MPEG-4 FGS, it will be clear to a person skilled in the art that the invention can be advantageously applied to any scalable coding scheme. From an application point of view, the distortion is a significant parameter for the MPEG-4 FGS scheme. If distortion information is not available, the usability of FGS is limited, as is demonstrated below by giving various applications that do need this information. According to an embodiment of the invention, the FGS bit stream syntax is enhanced by adding quality (distortion) information. This can be done at no or a negligible increase in bit rate and extends the range of applications for FGS.

A first application of the invention is the coding for a constant-quality (thus variable bit rate) output. This can be used, for example, for recording video data with constant quality on a storage medium that allows for a variable bit rate. Using the quality information, the final bit stream does not need to be produced during the initial encoding but it can be obtained by processing the encoded bit stream at a later time.

Selling the same content at different qualities can be efficiently implemented using a scalable (fine granularity or layered) compression method such as described above followed by encryption of one or more of the layers: a property of many scalable compression methods is that when the lowest scalability layer is not available, the higher scalability layers are useless, i.e. cannot be used to increase the quality. When the scalably compressed content is encrypted, it is still possible to use it for elastic storage, i.e. to reduce the amount of storage space by throwing away some of the enhancement layer(s). For elastic storage, reference is made to PHNL000110 as mentioned before. To decide how much data to remove, some information about the associated quality loss should be available, since this information can no longer be derived from the compressed bit stream without decrypting it. In the current embodiment of the invention, the quality information is sent as unencrypted information, e.g. as side information. The business model of selling the same content at different quality levels is closely related to elastic storage, since there too the same content is stored at multiple quality levels using scalable compression. The quality levels that are offered for purchase to the consumer preferably directly correspond to the quality levels used in the elastic storage system. This implies that when the elastic storage device wants to lower the quality of a certain content item, it can remove the highest encrypted quality layer, without needing to decrypt it. Since the device does thus not decrypt any data, there is no security or theft risk. To maintain security in the whole chain from content owner or service provider to consumer, the content is preferably compressed (using a scalable compression method) and encrypted at the desired quality levels by the content owner and then distributed in encrypted form to the elastic storage device (either directly transmitted or downloaded or indirectly via e.g. intermediate storage on an optical disk).

In an elastic storage application, the user (or the device based on what it knows about the preferences of the user) may optionally select a certain desired minimum quality level. I.e. content that is currently available at a higher quality level than minimally desired by the user may be reduced in quality, to make room for more different content, until it reaches the lowest quality acceptable to the user. When the content is still available in a higher quality, however, the user still has the option to purchase the higher quality. Of course the user (or device) may also preset different desired minimum quality levels for different types of content (like sports, talk shows, or movies).

Alternatively, it is also possible to let the service provider manage the storage space and determine which quality levels should be removed (in that case, the service provider keeps track of the qualities and may carry out the elastic storage functions). This could be useful e.g. when content is put on a set-top box containing a storage function (e.g. hard disk) by the service provider. Initially, the content could be offered to the user at a high quality. When the user does not watch/buy the content within a certain time, the quality level stored on the set-top box could be lowered to make room for different content.

The quality information also allows source encoding and channel coding to be carried out at a different time or location. This is useful because at the time of encoding the channel characteristics may not yet be known. Also, the same encoded bit stream may serve different channels with different error characteristics. Finally, no storage space is wasted for storing the error correction overhead. It can be generated when needed, since the quality fields give the required information for adding the channel coding (using unequal error protection).

Then there are applications where multiple encoded FGS frames have to be jointly processed. This can occur, for example, in a congested network node, where temporarily less bandwidth is available. The network node can then use the quality information to optimally truncate the bit streams with the minimal loss of quality. Because multiple objects are involved, with possibly very different rate-distortion curves, the truncation cannot be satisfactorily done without the quality information.

Additionally, for streaming applications the quality information can provide the server with a good tool to perform the rate-control at transmission time and also the trade-off between SNR and temporal enhancements (FGS versus FGST, see for definitions N3315).

In MPEG-4 FGS, the quality information that is needed is actually the rate-distortion curve for the scalable enhancement layer. Since the rate is obvious, only the distortion information has to be added. Two solutions are proposed that allow adding this information with no or minimal modifications of the current FGS bit stream syntax.

Solution A. The start of a bit plane is a good point for adding quality information/fields, because it allows to easily retrieve the information and also provides sufficient samples to accurately describe the rate-distortion curve. The "quality code" would be similar to the current fgs_bp_start_code, whose last 5 bits indicate the ID of the bit plane. Instead of the bit plane ID, the quality information can be inserted in these 5 bits. In a preferred embodiment, a bit is added to the syntax to indicate whether the fgs_bp_start_code contains either the bit plane ID or the quality information.

Solution B. Alternatively, a new code could be defined for the quality information and be inserted after the fgs_bp_start_code. In this case, the quality tag can have 8 bits.

The information we propose to store in the quality field is the distortion after completely decoding the bit plane following the quality field. In this way, when the stream is truncated inside a bit plane, the approximate quality may be obtained by interpolation. This is easier than the extrapolation that would be required if the quality field were to contain information about the distortion before decoding the current bit plane. For example, let $Q1$ be the quality before decoding a bit plane and $Q2$ the quality after decoding it (as proposed above, $Q2$ is known to the decoder already at the start of the bit plane). If the stream is truncated inside the bit plane, it is thus known that the true quality Q lies inside the interval $<Q1,Q2>$. It can therefore simply be approximated as $Q \cong (Q1+Q2)/2$. A more accurate approximation can be made by also taking into account the number of decoded DCT blocks. For example, if the enhancement information for the current bit plane has been received for n out of the N total blocks for a frame, the true quality can be approximated as $Q \cong Q1+(Q2-Q1)*n/N$.

In a preferred embodiment for Solution A, a first quality field for an enhancement VOP, i.e. the field for the most significant (MSB) bit plane, contains an absolute quality (distortion), whereas the additional fields contain quality improvements (distortion reductions) relative to the previous quality. The absolute quality can be used to compare different objects. Putting quality improvements in the additional fields allows these improvements to be represented with a higher accuracy then when absolute qualities would be used. This is particularly important when only 5 bits are available for each field.

To quantify the quality, preferably PSNR values are used. As stated above, the first quality field contains the absolute quality. We propose to use the 5 bits to give the PSNR after decoding the first (MSB) bit plane, with a range of 18 . . . 49 dB in steps of 1 dB. This range covers all practically relevant PSNR values: when the PSNR is above 49 dB, the base layer already contains a near-lossless representation of the object. A PSNR that is lower than 18 dB would mean the base layer provides an extremely low quality, which is not very likely. When values outside the range do occur, they will be clipped to either 18 or 49 dB, depending on whether they fall below or above the allowed range.

The next quality fields will then contain the improvement in quality for completely decoding the following bit plane, relative to the quality after decoding the previous bit plane. Preferably, the 5 bits are used for giving these quality improvements the range of 0 . . . 6.2 dB in steps of 0.2 dB. Since a single bit is added, the improvement cannot exceed 6.02 dB, so this range is sufficient.

For Solution B, when 8 bits are used for the quality tag, the quality values (both absolute and differential) could be represented with even finer grain. However, Solution B would also allow us to simply use only absolute (i.e. non-differential) quality values. The quality range would then be 18 . . . 60.5 dB in steps of $1/6 \approx 0.167$ dB (or 18 . . . 49.875 dB in steps of 0.125 dB).

Various applications of MPEG-4 FGS have been discussed above, which application need quality information. Since this information is only completely available when the original encoding takes place, it is added to the bit stream to make it available for later use. This can be done at no or a negligible increase in bit rate with minimal modifications of the current bit stream syntax. Two detailed solutions have been presented for adding the PSNR quality values. Solution B using absolute quality values is preferred.

The invention applies to all cases where multiple scalably compressed multi-media objects have to be jointly stored or transmitted and some of these objects have been compressed by MPEG-4 FGS incorporating the invention. Particular applications are the elastic memory applications as well as transmission channels or networks dealing with multiple objects/users. When the memory/channel/network has to be shared by few objects/users they get a high quality. The quality is automatically reduced to accommodate more objects/users. This can be done efficiently, i.e. with low overhead, because of the presence of the quality tags according embodiments of this invention.

The invention can also be advantageously applied for applications in which source coding and channel coding are not carried out at the same time or location. The quality tags then give the required information for adding the channel coding (unequal error protection, e.g. more protection for parts of the bit-stream that represent higher quality, or more protection for parts of the bit-stream with a high quality to number of bits ratio).

The invention may also be advantageously applied in the context of scalable image processing schemes such as JPEG2000, see document ISO/IEC JTC 1/SC 29/WG 1 N1646, dated 16 Mar. 2000, which is incorporated by reference herein. The quality information may conveniently be included in JPEG2000, because a Comment and Extension Marker (CME) has already been defined (see page 51 of document N1646), which allows unstructured data in the header. Quality information is advantageously included in a given CME. E.g. binary data can be included (Rcme=0). Further, according to an embodiment of the invention, a separate Rcme type is defined for quality tags.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of coding a multi-media object, the method comprising the steps of:
   coding the object via a scalable encoder unit to obtain a bit-stream having multiple coded parts, each coded part including a header and a data part,
   generating quality information via a quality information generating unit which indicates distortion of a remaining non-truncated portion of the object, where the quality information is directly correlated to the truncation of the bit-stream during decoding in relation to the data parts of the coded parts of the bit-stream, and
   adding quality information to the bit-stream via at the scalable encoder unit such that the quality information is situated throughout the bit-stream in a manner selected from at least one of the group consisting of: approximately equal distance through the bit-stream and based on a bit-rate/quality curve,
   wherein the quality of information comprising quality tags represent a distortion measure indicative of a quality of reproduction of the remaining non-truncated portion of the object when the bit-stream is truncated at a point related to a given tag, which point may occur just after or just before a currently encoded data part.

2. A method as claimed in claim 1, wherein the coding step is a scalable coding step to obtain a scalable bit-stream.

3. A method as claimed in claim 1, wherein the quality information relates to an object reproduction quality.

4. A method as claimed in claim 3, wherein the quality information is based on a signal to noise ratio value.

5. A method as claimed in any of the preceding claims, wherein the quality information is in the form of quality tags.

6. A method as claimed in claims 1, wherein the quality information is incorporated in existing fields of a given scalable coding standard.

7. A method as claimed in claim 2, wherein the scalable bit-stream includes several layers and wherein respective layers include respective quality information.

8. A method as claimed in claim 1, wherein the bit-stream is encrypted and the quality information is unencrypted.

9. A method of controlling at least one bit-stream representing a multi-media object in which bit-stream quality information has been added into headers of coded parts of the bit-stream situated before data parts of the coded parts, the quality information indicating distortion of the objection in relation to a given position in the bit-stream, the method comprising the steps of:
   receiving the at least one bit-stream via an input unit,
   extracting the quality information from the headers of the coded parts of the bit-stream via a quality information generation unit,
   transcoding or truncating the at least one bit-stream via a truncator unit in the case where a desired combination of bit-rate and distortion of the at least one bit-stream differs from a current combination of bit-rate and distortion of the at least one received bit-stream, wherein a quality of the truncated at least one bit-stream is determined as an interpolation of the quality information of one or more coded parts contained in corresponding headers near a truncation point, and
   providing the at least one bit-stream at the desired combination of bit-rate and distortion via a reproduction unit,
   wherein the quality of information comprising quality tags represent a distortion measure indicative of a quality of reproduction of a remaining non-truncated portion of the object when the bit-stream is truncated at a point related to a given tag, which point may occur just after or just before a currently encoded data part.

10. A method of transmitting at least one multi-media object using a transmitter which generates and transmits a bit-stream which is subsequently reproducible by a reproduction unit or decoder to obtain the multi-media object, the method comprising the steps of:
   coding the object to obtain a bit-stream having multiple coded parts via a scalable encoder, each coded part including a header and a data part, generating quality information via a quality information generation unit which indicates distortion of the object when the bit-stream is truncated during decoding in relation to the data pars of the coded parts of the bit-stream, wherein the quality information of the truncated bit-stream is determined as an interpolation of the quality information one or more coded parts contained in corresponding headers near a truncation point adding the quality information to the bit-stream into the headers of the coded parts of the bit-stream via the scalable encoder such that the quality information is situated throughout the bit-stream, and transmitting the bit-stream via a transmitter in which the quality information has been added, wherein the quality of information comprising quality tags represent a distortion measure indicative of a quality of reproduction of a remaining non-truncated portion of the object when the bit-stream is truncated at a point related to a given tag, which point may occur just after or just before a currently encoded data part.

11. A method of receiving at least one bit-stream representing a multi-media object in which bit-stream quality information has been added into headers of coded parts of the bit-stream situated before data parts of the coded parts, the quality information indicating a distortion of the object in relation to a given position in the bit-stream, the method comprising the steps of:

extracting the quality information from the headers of the coded parts of the bit-stream via a quality information generation unit, transcoding or truncating the at least one bit-stream via a truncator unit in the case a desired combination of bit-rate and distortion of the at least one bit-stream differs from a current combination of bit-rate and distortion of the at least one received bit-stream, wherein a quality of the truncated at least one bit-stream is determined as an interpolation of the quality information of one or more coded parts in corresponding headers near a truncation point, providing the at least one bit-stream at the desired combination of bit-rate and distortion, and decoding the at least one bit-stream at the desired combination of bit-rate and distortion via a decoder, wherein the quality of information comprising quality tags represent a distortion measure indicative of a quality of reproduction of a remaining non-truncated portion of the object when the bit-stream is truncated at a point related to a given tag, which point may occur just after or just before a currently encoded data part.

12. A method of receiving at least one bit-stream representing a multi-media object in which bit-stream quality information has been added into headers of coded parts of the bit-stream situated before the data parts of the coded parts and enabling the multi-media object to be reproduced by a reproduction unit, the quality information indicating a distortion of the object in relation to a given position in the bit-stream upon truncation, the method comprising the steps of:

extracting the quality information from the headers of the coded parts of the bit-stream via a quality information generation unit;

decoding the bit-stream to obtain a decoded multi-media object via a decoder; and processing the multi-media object in dependence on the extracted quality information obtained from the header of one or more coded parts of the bit-stream via processing means such that the processed multi-media object is reproducible by the reproduction unit, wherein the quality information of the multi-media object is determined as an interpolation of the quality information of one or more coded parts in corresponding headers near a truncation point wherein the quality of information comprising quality tags represent a distortion measure indicative of a quality of reproduction of a remaining non-truncated portion of the object when the bit-stream is truncated at a point related to a given tag, which point may occur just after or just before a currently encoded data part.

13. A device of coding a multi-media object, the device comprising:

means for coding the object to obtain a bit-stream having multiple coded parts, each coded part including a header and a data part, means for generating quality information which indicates distortion of the object when the bit-stream is truncated during decoding in relation to the data parts of the coded parts of the bit-stream, wherein the quality information is directly correlated to the truncation of the bit-stream during decoding in relatio to the data parts of the coded parts of the bit-stream, and means for adding the quality information into the bit-stream, such that the quality information is situated throughout the bit-stream in a manner selected from at least one of the group consisting of: approximately equal distance throughout the bit-stream and based on a bit-rate/quality curve wherein the quality of information comprising quality tags represent a distortion measure indicative of a quality of reproduction of a remaining non-truncated portion of the object when the bit-stream is truncated at a point related to a given tag, which point may occur just after or just before a currently encoded data part.

14. A device according to claim 13, wherein the device is included as an element of a transmitter.

15. A controller for controlling at least one bit-stream representing a multi-media object in which bit-stream quality information has been added into headers of coded parts of the bit-stream situated before data parts of the coded parts, the quality information indicating distortion of the objection in relation to a given position in the bit-stream, the controller comprising:

means for receiving the at least one bit-stream, means for extracting the quality information from the headers of the coded parts of the bit-stream, means for truncating the at least one bit-stream in the case a desired combination of bit-rate and distortion of the at least one bit-stream differs from a current combination of bit-rate and distortion of the at least one received bit-stream, wherein a quality of the truncated at least one bit-stream is determined as an interpolation of the quality information of one or more coded parts in corresponding headers near a truncation point, means for providing the at least one bit-stream at the desired combination of bit-rate and distortion wherein the quality of information comprising quality tags represent a distortion measure indicative of a quality of reproduction of a remaining non-truncated portion of the object when the bit-stream is truncated at a point related to a given tag, which point may occur just after or just before a currently encoded data part.

16. A controller according to claim 15, wherein the controller is included as an element of a receiver.

17. A receiver for receiving at least one bit-stream representing a multi-media object in which bit-stream quality information has been added into headers of coded parts of the bit-stream situated before data parts of the coded parts, the quality information indicating a distortion of the object in relation to a given position in the bit-stream, the receiver comprising:
- means for extracting the quality information from the headers of the coded parts of the bit-stream;
- means for decoding the bit-stream to obtain a decoded multi-media object; and
- means for processing the multi-media object in dependence on the extracted quality information obtained from the header of one or more coded parts of the bit-stream wherein the quality information of the multi-media object is determined as an interpolation of the quality information of one or more coded parts in corresponding headers near a truncation point wherein the quality of information comprising quality tags represent a distortion measure indicative of a quality of reproduction of a remaining non-truncated portion of the object when the bit-stream is truncated at a point related to a given tag, which point may occur just after or just before a currently encoded data part.

18. A controller according to claim 15, wherein the controller is an element of a multiplexer or network node.

19. A non-transitory computer readable storage medium comprising an executable code to be executed by a content processing device, the computer executable code configured to cause a processor of the content processing device to perform the method of claim 1.

* * * * *